United States Patent
Mahe et al.

(10) Patent No.: US 10,408,299 B2
(45) Date of Patent: Sep. 10, 2019

(54) DAMPING SYSTEM OF PENDULUM OSCILLATOR TYPE

(71) Applicant: Valeo Embrayages, Amiens (FR)

(72) Inventors: Hervé Mahe, Salouel (FR); Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 172 days.

(21) Appl. No.: 15/305,671

(22) PCT Filed: Apr. 21, 2015

(86) PCT No.: PCT/FR2015/051078
§ 371 (c)(1),
(2) Date: Oct. 21, 2016

(87) PCT Pub. No.: WO2015/162374
PCT Pub. Date: Oct. 29, 2015

(65) Prior Publication Data
US 2017/0045114 A1 Feb. 16, 2017

(30) Foreign Application Priority Data
Apr. 24, 2014 (FR) .................................... 14 53664

(51) Int. Cl.
*F16F 15/14* (2006.01)
(52) U.S. Cl.
CPC ................................ *F16F 15/145* (2013.01)
(58) Field of Classification Search
CPC ...... F16F 15/14; F16F 15/145; F16F 15/1457; F16F 15/20
See application file for complete search history.

(56) References Cited

U.S. PATENT DOCUMENTS 9,404,555 B2 * 8/2016 Nishii .................. F16F 15/145
9,429,211 B2 * 8/2016 Orlamunder .......... F16F 15/123
(Continued)

FOREIGN PATENT DOCUMENTS

DE 102013213011 1/2014
FR 2981714 4/2013
(Continued)

OTHER PUBLICATIONS

Denman, H.H., "Tautochronic bifilar pendulum torsion absorbers for reciprocating engines", Journal of Sound and Vibration, vol. 159, Issue 2, Dec. 8, 1992, pp. 251-277 https://doi.org/10.1016/0022-460X(92)90035-V.

*Primary Examiner* — Adam D Rogers
(74) *Attorney, Agent, or Firm* — Berenato & White, LLC

(57) ABSTRACT

A vibration damping system for a transmission system, exhibiting a stiffness K, of a motor vehicle having a combustion engine, having a support member able to be rotationally driven around an axis X, having a moment of inertia I; and a pendulum flyweight mounted movably on the support member, the pendulum flyweight being tuned to a tuning order n, the pendulum flyweight having a first resonance order of an order lower than the tuning order n, and a second resonance order higher than the tuning order n; the moment of inertia I of the support being configured for any engine speed value within an engine speed range of the combustion engine from 600 to 5000/n revolutions per minute, and for a given stiffness K of the transmission system, the second resonance order of the pendulum flyweight is different from an order y*n, where y is an integer.

17 Claims, 2 Drawing Sheets

(56) References Cited

U.S. PATENT DOCUMENTS

| | | | |
|---|---|---|---|
| 2010/0242466 A1* | 9/2010 | Krause | F16F 15/145 |
| | | | 60/327 |
| 2014/0102398 A1* | 4/2014 | Orlamunder | F16F 15/12 |
| | | | 123/192.1 |
| 2014/0251075 A1* | 9/2014 | Verhoog | F16F 15/145 |
| | | | 74/574.2 |
| 2015/0240912 A1 | 8/2015 | Maienschein et al. | |

FOREIGN PATENT DOCUMENTS

| | | | |
|---|---|---|---|
| WO | WO2012150401 | 11/2012 | |
| WO | WO-2015162373 A1 * | 10/2015 | F16F 15/145 |

\* cited by examiner

US 10,408,299 B2

DAMPING SYSTEM OF PENDULUM OSCILLATOR TYPE

CROSS-REFERENCE TO RELATED APPLICATIONS AND CLAIM TO PRIORITY

This application is a national stage application of International Application No. PCT/FR2015/051078 filed Apr. 21, 2015, which claims priority to French Patent Application No. 1453664 filed Apr. 24, 2014, the disclosures of which are incorporated herein by reference and to which priority is claimed.

FIELD A THE INVENTION

The invention relates to the field of vibration damping system of the pendulum oscillator type, intended to be part of motor vehicle transmissions.

BACKGROUND OF THE INVENTION

A combustion engine exhibits irregularities due to the successive combustion events in the cylinders of the engine, the frequency of the irregularities varying in particular depending on the number of cylinders operating and the rotation speed of the engine. The function of a damping system is to filter, upstream from the gearbox, the vibrations caused by the irregularities. Otherwise the vibrations penetrating into the gearbox would cause particularly undesirable shocks, noise, or acoustic impacts therein during operation.

Damping systems of the pendulum type, also called "pendulum oscillators" or "pendulums," which are part of motor vehicle transmissions, are known in the existing art.

A vibration damping system of the pendulum type is described in particular in the document FR2981714. This system has pendulum flyweights mounted movably on a support pivoting around an axis. Each pendulum flyweight is mounted on the support by means of a guidance device. The pendulum flyweights are tuned as a function of the number of cylinders in the engine in order to filter the vibrations at an order for which said vibrations, caused by the irregularities of the engine, are most significant.

It has been found that for certain engine speeds, harmonics of an order higher than the order of the preponderant harmonics to be filtered are amplified despite strong damping of the preponderant harmonics.

The document US2014/0102398 furthermore describes a device whose masses and/or inertial masses of the pendulum flyweights are adapted so that the sets of pendulum flyweights do not interfere with each other, but this also degrades the performance of the vibration damping system.

SUMMARY OF THE INVENTION

One aspect of the invention proceeds from the idea of remedying the drawbacks of the existing art by proposing a particularly effective vibration damping system.

According to an embodiment, the invention furnishes a vibration damping system intended to be integrated into a transmission system, exhibiting a stiffness K, of a motor vehicle having a combustion engine, having:
 a support member able to be rotationally driven around an axis X, having a moment of inertia I; and
 a pendulum flyweight mounted movably on the support member, the pendulum flyweight being tuned to a tuning order n, the pendulum flyweight having a first resonance order of an order lower than the tuning order n, and a second resonance order higher than the tuning order n;
 the moment of inertia I of the support being configured such that for any engine speed value within an engine speed range of the combustion engine from 600/n to 5000/n revolutions per minute (RPM), and for a given stiffness K of the transmission system, the second resonance order of the pendulum flyweight is different from the order 2n.

The damping system according to the invention thus allows placement of a set of pendulum flyweights tuned so as to filter the vibrations according to a principal order but without thereby amplifying higher-order harmonics, thus greatly improving the filtering effectiveness of the system. In particular, this system prevents matching between a second resonance order of the set of pendulum flyweights and an order for which the irregularities of the engine generally cause vibrations.

The moment of inertia I of the support allows the tuning and resonance orders of the first and second set of pendulum flyweights to be influenced, but without affecting the performance of the vibration damping system.

Advantageously, only the moment of inertia of the support is configured so that the second resonance order of the first set of pendulum flyweights is different from the tuning order m of the second set of pendulum flyweights. The masses and/or inertial masses of the pendulum flyweights are then not configured so that the second resonance order of the first set of pendulum flyweights is different from the tuning order m of the second set of pendulum flyweights, with the result that the performance of the vibration damping system remains unchanged.

According to other advantageous embodiments, such damping system can exhibit one or more of the following characteristics:
 The moment of inertia I of the support is configured so that, for any engine speed value within an engine speed range from 600 to 5000/n revolutions per minute and for a given stiffness K of the transmission system, the second resonance order of the pendulum flyweight is different from the order z*n, where z is an integer.
 The moment of inertia I of the support is configured so that, for engine speed values from 600 to 5000/n revolutions per minute and for a given stiffness K of the transmission system, the second resonance order of the pendulum flyweight is higher than the order 2n.
 The moment of inertia I of the support is configured so that, for engine speed values from 600 to 5000/n revolutions per minute and for a given stiffness K of the transmission system, the second resonance order of the pendulum flyweight varies within a range of variation that is centered between 2n and 3n.
 The moment of inertia I of the support is configured so that, for any engine speed value in an engine speed range from 600 to 5000/n revolutions per minute and for a given stiffness K of the transmission system, the second resonance order of the pendulum flyweight varies within a range of variation between 2.5n and 3n.
 The moment of inertia I of the support is configured so that, for any engine speed value in an engine speed range from 600 to 50001n revolutions per minute and for a given stiffness K of the transmission system, the filtering ratio of the set of pendulum flyweights is less than 1 at order 2n.
 The moment of inertia I of the support is configured so that, for any engine speed value in an engine speed range from 600 to 5000/n revolutions per minute and for a given stiffness K of the transmission system, the filtering ratio of the et of pendulum flyweights is than at order 3n.

The invention also relates to a transmission assemblage having a transmission system exhibiting a given stiffness K connected to a combustion engine having n cylinders where n is an integer, the transmission system having a damping system as described above whose set of pendulum flyweights is tuned to order n.

One aspect of the invention proceeds from the idea of ensuring that the pendulum flyweight does not amplify vibrations at the level of tuning orders different from the principal tuning order.

BRIEF DESCRIPTION OF THE DRAWINGS

The invention will be better understood, and other objectives, details, characteristics, and advantages thereof will emerge more clearly, in the course of the description below of several specific embodiments of the invention, provided solely for illustrative purposes and not limiting, referring to the attached Figures.

In those Figures.

DETAILED DESCRIPTION OF THE PREFERRED EMBODIMENT(S)

In the description and the claims, the terms "outer" and "inner" as well as the orientations "axial" and "radial" will be used to designate the elements of the damping system in accordance with the definitions given in the description. By convention, the "radial" orientation is directed orthogonally to the rotation axis (X) of the damping system which determines the "axial" orientation; and, from inside to outside moving away from said axis, the "circumferential" orientation is directed orthogonally to the axis of the damping system and orthogonally to the radial direction. The terms "outer" and "inner" are used to define the relative position of one element with respect to another with reference to the rotation axis of the damping system, the element close to the axis thus being referred to as "inner" as opposed to an "outer" element located radially at the periphery.

The damping system of the pendulum oscillator type is intended to be disposed in the transmission system of a motor vehicle between the combustion engine and the gearbox. It can be integrated in particular into an engine flywheel, a dual mass flywheel, a bypass clutch of a hydraulic coupling device, or a friction clutch.

Figure 1:
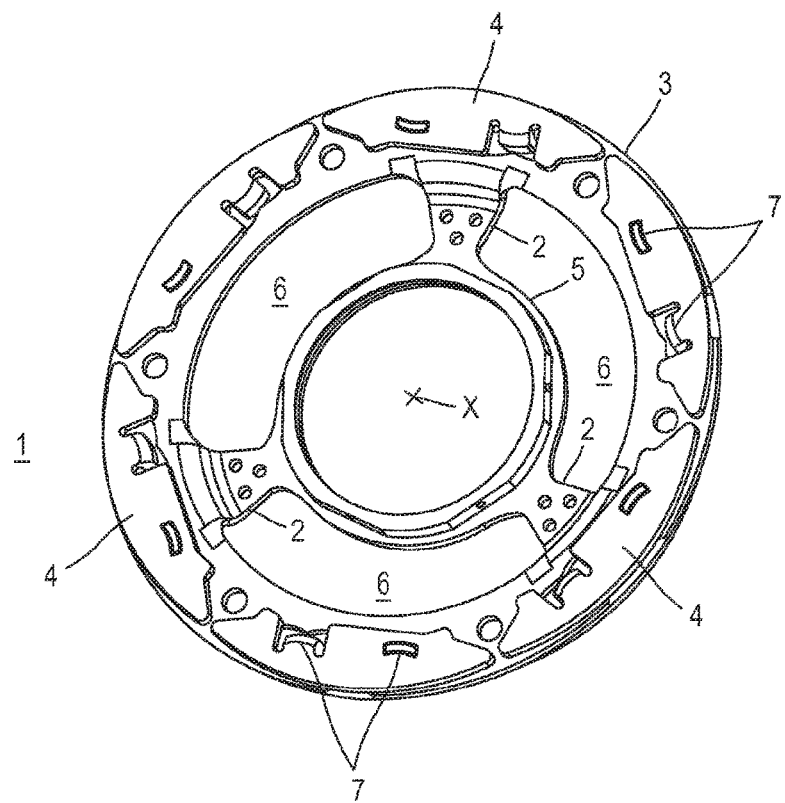
FIG. 1 is a schematic perspective view of a damping system having a set of pendulum weights.

FIG. 1 is a schematic perspective view of a damping system having a set of pendulum flyweights.

A damping system of the pendulum oscillator type is capable in particular of being integrated into an elastic-member torsional damper (not depicted). A torsional damper has an input element intended to be rotationally driven by a driving shaft such as the crankshaft of the combustion engine, an output element intended to be rotationally connected to a driven shaft such as the input shaft of the gearbox, and circumferentially acting elastic members arranged to transmit torque and to damp rotational irregularities between the input element and output element.

In an embodiment, the damping system has a support member 1 capable of being rotationally driven around an axis X. Support member 1 is intended to constitute a phase washer for a torsional damper having two groups of elastic members in series, for example as in the document WO 2012 150401. A phase washer of this kind is mounted freely rotatably with respect to the input element and output element, and allows the transmission of torque between the two groups of elastic members in series. To do so, support member 1 has radial tabs 2 intended to be interposed circumferentially between the two groups of elastic members in order to ensure torque transmission between those two groups of elastic members in series.

In another embodiment (not depicted) support member 1 is intended to constitute a web for a dual mass flywheel. A web of this kind is fastened to the secondary mass of the dual mass flywheel and has abutment tabs that interact with the ends of the springs of the dual mass flywheel.

Support member 1 has a ring 3 providing support for pendulum flyweights 4, and an inner hub 5 intended to ensure centering of support member 1 with respect to axis X. Hub 5 carries (three, in the embodiment depicted) radial tabs 2 that, as mentioned previously, are able to transmit a torque between two groups of elastic members. Support member 1 has regions 6 arranged to receive elastic members. Each of said receiving regions 6 for the elastic members extends radially between ring 3 and inner hub 5, and circumferentially between two adjacent radial tabs 2.

The damping system has a plurality of pendulum flyweights 4 distributed circumferentially on support member 1. Pendulum flyweights 4 are able to oscillate with respect to support member 1, in a plane orthogonal to rotation axis X, in reaction to rotational irregularities.

Since the pendulum oscillator is of the bifilar type, the oscillations of each pendulum flyweight 4 are guided with respect to support member 1 by two guidance devices 7. Each guidance device 7 has a rolling body interacting on the one hand with an inner raceway of pendulum flyweight 4, and on the other hand with an outer raceway carried by support member 1. The raceways are arranged in such a way that the oscillation frequency of pendulum flyweights 4 is proportional to the rotation speed of the driving shaft in accordance with a multiple that assumes a value close to the harmonic order of the vibrations that are intended to be damped.

A method allowing determination of the geometry of raceways in order to tune a pendulum oscillator is described in particular in the document "Tautochronic bifilar pendulum torsion absorbers for reciprocating engines," Journal of Sound and Vibration (1992), 159(2) 251-277.

In general the tuning order of a pendulum weight is such that $$n_{mp} \cong \sqrt{R/L} \tag{1}$$

in which $n_{mp}$ is the tuning order of the pendulum flyweight, L is the radius of the circular arc traveled by the center of mass of the pendulum flyweight with respect to the support, and R is the distance between rotation axis X and the center of the circular arc traveled by the center of mass of the pendulum flyweight with respect to the support.

Figure 2:
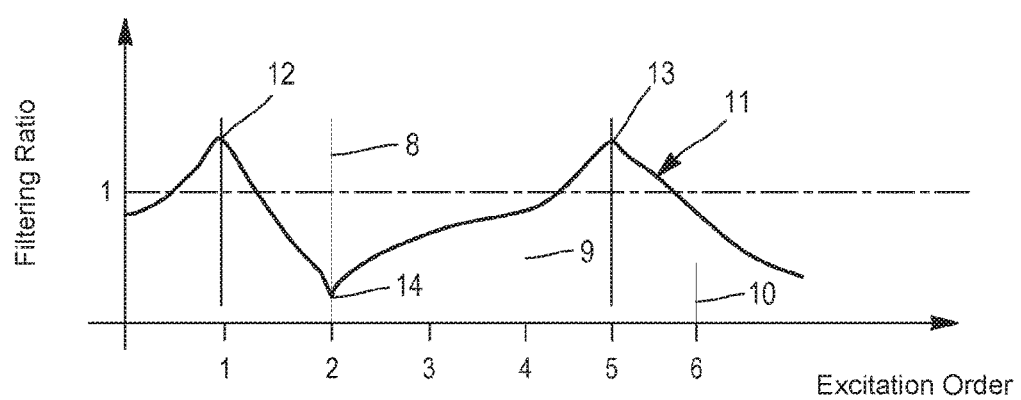
FIG. 2 is a graph depicting, for a given engine speed and as a function of the excitation order, on the one hand the harmonics generated by the irregularities of the engine, and on the other hand the filtering ratio for a damping system having a set of pendulum flyweights.

FIG. 2 depicts, for a given transmission system stiffness and a given engine speed, and as a function of the order of the excitations, on the one hand the harmonics generated by the irregularities of a four-cylinder engine, and on the other hand the filtering ratio of a set of pendulum flyweights tuned around order 2.

The most important harmonic order depends on the number of cylinders active in the engine. In general, an engine operating with 2n cylinders that are active generates harmonics of order n, 2n, 3n, 4n, etc. The principal harmonic order, i.e. the harmonic order for which the irregularities of the engine generate the most vibrations, is the order n. The irregularities of the engine also generate secondary harmonics whose order is a multiple of the principal harmonic order. The secondary harmonics have amplitudes that are lower than that of the principal harmonic and that decrease as the order increases. The order-2n harmonic thus has a lower amplitude than the order-n harmonic, the order-3n harmonics have a lower amplitude than the order-2n harmonics, etc. Beyond order 4n the harmonics are generally negligible.

In order to damp vibrations of the principal harmonic, pendulum flyweights 4 are tuned around order n. Note, however, that it is possible to slightly over-tune or under-tune the pendulum flyweights. It is therefore considered that in order to filter the vibrations caused by an engine operating with 2n cylinders, the tuning of the pendulum flyweights can vary by plus or minus 10% on either side of order n.

A set of pendulum flyweights 4 tuned to damp vibrations of order n also, however, generates amplifications of vibrations of other orders. More particularly, a set of pendulum flyweights 4 tuned to an order n generates a first amplification peak at an order lower than n, and a second amplification peak at an order higher than n. A vibration amplification peak, called a "resonance order," of the set of pendulum weights, conforms to the equation below:

$$n_R = \frac{1}{\Omega}\sqrt{\frac{(RI\Omega^2 + KL + m_p R(R+L)^2\Omega^2) \pm \sqrt{(RI\Omega^2 + KL + m_p R(R+L)^2\Omega^2)^2 - 4ILRK\Omega^2}}{2IL}} \quad (2)$$

In this equation, $n_R$ is the resonance order of the set of pendulum flyweights 4, $\Omega$ is the average rotation speed of the system over one revolution, I is the moment of inertia of support 1, $m_p$ is the mass of the set of pendulum flyweights 4, and K is the stiffness of the transmission assemblage into which the damping system is integrated.

The values that solve equation (2) and define the resonance orders of the set of pendulum flyweights 4 must be adapted so that said resonance orders do not coincide with the secondary harmonic orders. The values of R and L for the set of pendulum flyweights are thus defined so as to damp vibrations of the principal harmonic order, however, and thus cannot be modified. It is furthermore preferable to define the mass $m_p$ of the set of pendulum flyweights 4 at the maximum tolerated by the system in order to obtain the best possible damping. It is likewise possible to vary the stiffness K of the transmission system in order to adapt the resonance orders of the set of pendulum flyweights. This solution has an impact, however, on the totality of the transmission system. As a consequence, it is advantageously the moment of inertia I of the support that is determined so as to ensure that for a given tuning of said set of pendulum flyweights 4, the resonance orders of the set of pendulum flyweights 4 do not coincide with the secondary harmonic orders generated by the engine.

FIG. 2 depicts, for a given stiffness of the transmission system and a given engine speed, the harmonics generated by a four-cylinder combustion engine. A principal harmonic 8 is generated at order 2; a second harmonic 9, lower than the principal harmonic 8, is generated at order 4; and a third harmonic 10, lower than the second harmonic 9, is generated at order 6.

A set of flyweights 4 tuned around order 2 is associated with this four-cylinder engine. FIG. 2 illustrates, with a resonance-antiresonance-resonance curve 11, the filtering ratio of this set of pendulum flyweights 4 as a function of the excitation order for a given engine speed.

Curve 11 exhibits a first vibration amplification peak 12, called a "first resonance order" 12, around order 1. Curve 11 exhibits a second vibration amplification peak 13, called a "second resonance order" 13, around order 5. First resonance order 12 and second resonance order 13 are located on either side of antiresonance peak 14 corresponding to the tuning order of the set of pendulum weights 4.

The set of pendulum flyweights 4 allows damping of the harmonics of order 2 generated by the four-cylinder engine. The harmonics of order 4 and 6 are, however, also filtered by the set of pendulum flyweights 4, as shown by curve 11. The filtering of the secondary-order harmonics effected by the set of pendulum flyweights 4 can be expressed as a damping of the vibrations, or conversely as an amplification of the vibrations. For example, if the second resonance peak 13 coincides with the harmonic of order 4, the vibrations of that order 4 are then amplified. This coincidence can cause vibrations of order 4 that are greater than the order-2 harmonics generated without damping by the set of pendulum flyweights. A situation like this ends up generating more vibration when a set of pendulum flyweights is installed than when it is absent, which is the opposite of the intended purpose of installing such a set of pendulum flyweights. The inertial support must therefore preferably have a filtering ratio of less than 1 for the second harmonics, as depicted by curve 11 illustrated in FIG. 2.

Figure 3:
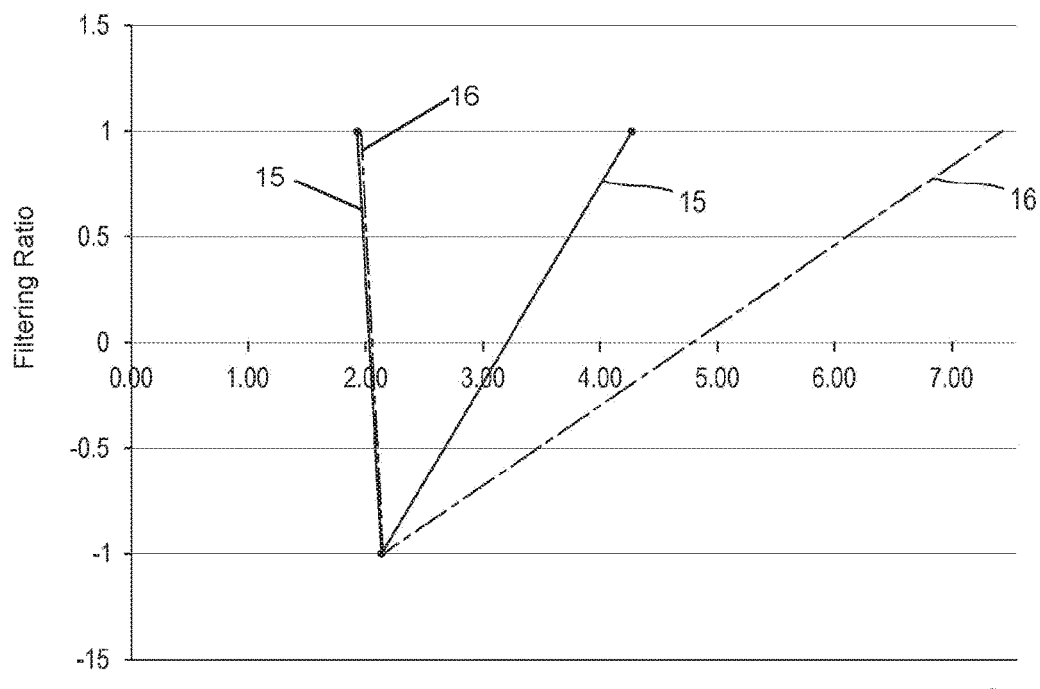
FIG. 3 is a graph depicting the resonance-antiresonance-resonance points of a set of pendulum flyweights mounted on supports exhibiting different moments of inertia.

In FIG. 3, pendulum flyweights 4 are characterized by a mass $m_p$ of 1 kg; a distance R, between rotation axis X and the center of the circular arc traveled by the center of mass of pendulum flyweights 4 with respect to the support, of 0.125 m; and a radius L, of the circular arc traveled by the center of mass of the pendulum flyweight, of 0.023 m. Pendulum flyweights 4 of this kind are thus tuned to order 2.105892 as can be confirmed with the aid of equation (1) above. This tuning is adapted to damp excitations of order 2. Pendulum flyweights 4 are integrated into a transmission system having a mounting stiffness of 5000 Nm/rd, and the engine is rotating at a speed of 1000 revolutions per minute.

In order nut to modify the tuning order of pendulum flyweights 4 while ensuring that: said pendulum flyweights 4 correctly perform their function, the moment of inertia I of the support is advantageously selected so that the filtering ratios of the set of pendulum flyweights are less than 1 for multiples of the tuning order.

A first curve 15 depicts the resonance-antiresonance-resonance points of the set of pendulum flyweights when they are mounted on a support having a moment of inertia of 0.03 kg·m². A second curve 16 depicts the resonance-antiresonance-resonance points of the set of pendulum flyweights when they are mounted on a support having a moment of inertia of 0.01 kg·m².

First curve 15 has resonance peaks for orders 1.92 and 4.27. With a support having a moment of inertia of 0.03 kg·m², the vibrations of order 2 are thus correctly damped but the vibrations of order 4 are amplified by the second resonance order of the set of pendulum flyweights 4, which is prejudicial to proper operation of the system.

Second curve 16 has resonance peaks for orders 1.95 and 7.29. With a moment of inertia of the support equal to 0.01 kg·m², the order-4 harmonic generated by irregularities of the engine is therefore not perturbed by the set of pendulum flyweights 4. In addition, the order-6 harmonic is only slightly perturbed by the set of pendulum flyweights 4, and the vibrations generated by the order-6 irregularities of the engine are still less than those of orders 2 and 4.

In a system exhibiting the characteristics depicted by curve 16 in FIG. 3, at an engine speed of 1000 revolutions per minute the damping system performs its function of damping vibrations of both order 2 and order 4, which is not the case with a support having a moment of inertia of 0.03 kg·m² as depicted by curve 15.

With regard to equation (2), note that it is also possible to retain the tuning order of the pendulum flyweights while modifying the stiffness of the system or even the mass of the pendulum.

Figure 4:
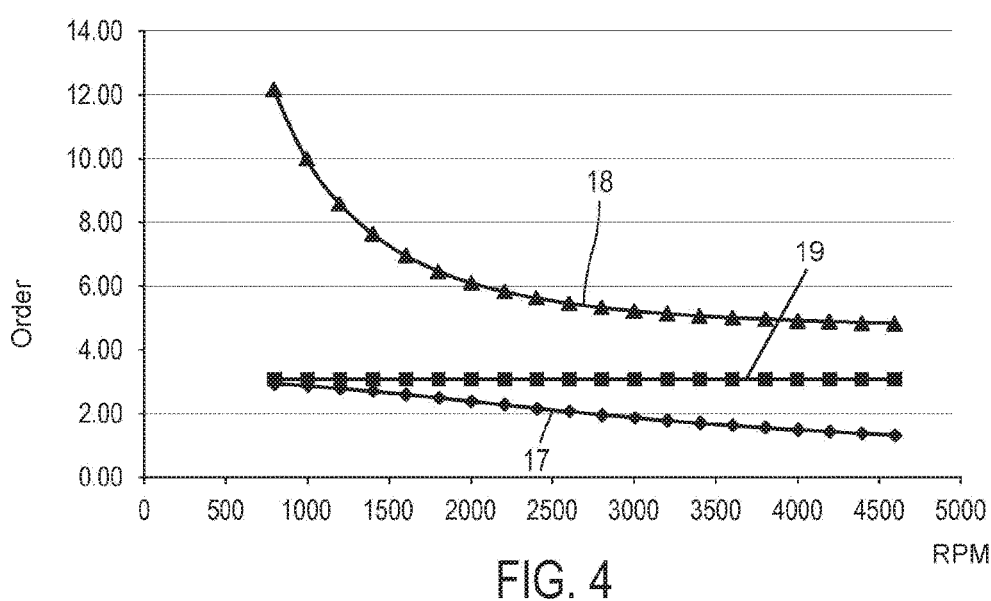
FIG. 4 is a graph depicting changes in the tuning order and resonance orders of a set of pendulum flyweights as a function of engine speed.

The resonance orders vary as a function of engine speed. The moment of inertia of the support is advantageously selected so that perturbations are minimal over the widest possible range of engine speeds. As depicted in FIG. 4, a set of pendulum weights tuned to order 3 generates a first resonance order 17 that varies from 2.9 to 1.5 for an engine speed varying from 800 revolutions per minute (RPM) to 4800 revolutions per minute (RPM). This set of pendulum flyweights tuned to order 3 (see the tuning order 19) also generates a second resonance order 18 that varies from 12 to 4.75 for an engine speed varying from 800 revolutions per minute to 4800 revolutions per minute (RPM).

In general, the moment of inertia of the support is selected so that the second resonance peak of a set of pendulum flyweights tuned to an order n does not generate a resonance peak of an order that is a multiple of n, for example order 2n, 3n, 4n, or z*n, where z is an integer.

Although the invention has been described in connection with several particular embodiments, it is quite apparent that it is in no way limited thereto and that it comprises all technical equivalents of the means described, as well as combinations thereof if they fall within the context of the invention.

Use of the verb "have," "comprise," or "include," and of conjugated forms thereof, does not exclude the presence of elements or steps other than those set forth in a claim. Use of the indefinite article "a" or "an" for an element or step does not, unless otherwise indicated, exclude the presence of a plurality of such elements or steps.

In the claims, any reference character in parentheses cannot be interpreted as a limitation of the claim.

The invention claimed is:

1. A vibration damping system intended to be integrated into a transmission system, exhibiting a stiffness (K), of a motor vehicle having a combustion engine, the vibration damping system comprising:
   a support member configured to be rotationally driven around an axis (X) and having a moment of inertia (I); and
   a pendulum flyweight mounted movably on the support member, the pendulum flyweight being tuned to a tuning order n, the pendulum flyweight having a first resonance order lower than the tuning order n, and a second resonance order higher than the tuning order n;
   the moment of inertia (I) of the support member being configured such that for any engine speed value within an engine speed range of the combustion engine from 600/n to 5000/n revolutions per minute, the second resonance order of the pendulum flyweight is different from z*n, where z is an integer.

2. The damping system according to claim 1, wherein the moment of inertia (I) of the support member is configured so that, for the any engine speed value within the engine speed range from 600/n to 5000/n revolutions per minute and for the stiffness (K) of the transmission system, the second resonance order of the pendulum flyweight is different from 2n.

3. The damping system according to claim 2, wherein the moment of inertia (I) of the support member is configured so that, for the any engine speed values within the engine speed range from 600/n to 5000/n revolutions per minute and for the stiffness (K) of the transmission system, the second resonance order of the pendulum flyweight is higher than 2n.

4. The damping system according to claim 2, wherein the moment of inertia (I) of the support member is configured so that, for the any engine speed values within the engine speed range from 600/n to 5000/n revolutions per minute and for the stiffness (K) of the transmission system, the second resonance order of the pendulum flyweight varies within a range between 2n and 3n.

5. The damping system according to claim 2, wherein the moment of inertia (I) of the support member is configured so that, for the any engine speed value in the engine speed range from 600/n to 5000/n revolutions per minute and for the stiffness (K) of the transmission system, the second resonance order of the pendulum flyweight varies within a range between 2.5n and 3n.

6. The damping system according to claim 2, wherein the moment of inertia (I) of the support member is configured so that, for the any engine speed value in the engine speed range from 600/n to 5000/n revolutions per minute and for the stiffness (K) of the transmission system, a filtering ratio of the pendulum flyweight at an order 2n is less than 1.

7. The damping system according to claim 2, wherein the moment of inertia (I) of the support member is configured so that, for the any engine speed value in the engine speed range from 600/n to 5000/n revolutions per minute and for the stiffness (K) of the transmission system, a filtering ratio of the pendulum flyweight at an order 3n is less than 1.

8. The damping system according to claim 2, wherein the moment of inertia (I) of the support member is configured so that, for the any engine speed value within the engine speed range from 600/n to 5000/n revolutions per minute and for the stiffness (K) of the transmission system, the second resonance order of the pendulum flyweight is higher than 2n.

9. The damping system according to claim 8, wherein the moment of inertia (I) of the support member is configured so that, for the any engine speed values within the engine speed range from 600/n to 5000/n revolutions per minute and for the stiffness (K) of the transmission system, the second resonance order of the pendulum flyweight varies within a range between 2n and 3n.

10. The damping system according to claim 8, wherein the moment of inertia (I) of the support member is configured so that, for the any engine speed value in the engine speed range from 600/n to 5000/n revolutions per minute and for the stiffness (K) of the transmission system, the second resonance order of the pendulum flyweight varies within a range between 2.5n and 3n.

11. The damping system according to claim 8, wherein the moment of inertia (I) of the support member is configured so that, for the any engine speed value in the engine speed range from 600/n to 5000/n revolutions per minute and for the stiffness (K) of the transmission system, a filtering ratio of the pendulum flyweight at an order 2n is less than 1.

12. The damping system according to claim 8, wherein the moment of inertia (I) of the support member is configured so that, for the any engine speed value in the engine speed range from 600/n to 5000/n revolutions per minute and for the stiffness (K) of the transmission system, a filtering ratio of the pendulum flyweight at an order 3n is less than 1.

13. The damping system according to claim 1, wherein the moment of inertia (I) of the support member is configured so that, for the any engine speed values within the engine speed range from 600/n to 5000/n revolutions per minute and for the stiffness (K) of the transmission system, the second resonance order of the pendulum flyweight varies within a range between 2n and 3n.

14. The damping system according to claim 1, wherein the moment of inertia (I) of the support member is configured so that, for the any engine speed value in the engine speed range from 600/n to 5000/n revolutions per minute and for the stiffness (K) of the transmission system, the second resonance order of the pendulum flyweight varies within a range between 2.5n and 3n.

15. The damping system according to claim 1, wherein the moment of inertia (I) of the support member is configured so that, for the any engine speed value in the engine speed range from 600/n to 5000/n revolutions per minute and for the stiffness (K) of the transmission system, a filtering ratio of the pendulum flyweight at an order 2n is less than 1.

16. The damping system according to claim 1, wherein the moment of inertia (I) of the support member is configured so that, for the any engine speed value in the engine speed range from 600/n to 5000/n revolutions per minute and for the stiffness (K) of the transmission system, a filtering ratio of the pendulum flyweight at an order 3n is less than 1.

17. A transmission assemblage having a transmission system connected to a combustion engine having n cylinders, the transmission system having the damping system according to claim 1.

\* \* \* \* \*